US011382730B2

(12) United States Patent
Fernie

(10) Patent No.: US 11,382,730 B2
(45) Date of Patent: *Jul. 12, 2022

(54) DENTAL APPLIANCE ETCH TEMPLATE

(71) Applicant: Align Technology, Inc., San Jose, CA (US)

(72) Inventor: Michael Lawrence Fernie, Richmond, CA (US)

(73) Assignee: Align Technology, Inc., San Jose, CA (US)

( * ) Notice: Subject to any disclaimer, the term of this patent is extended or adjusted under 35 U.S.C. 154(b) by 272 days.

This patent is subject to a terminal disclaimer.

(21) Appl. No.: 16/729,113

(22) Filed: Dec. 27, 2019

(65) Prior Publication Data

US 2020/0129279 A1 Apr. 30, 2020

Related U.S. Application Data

(63) Continuation of application No. 15/382,235, filed on Dec. 16, 2016, now Pat. No. 10,548,700.

(51) Int. Cl.
| | |
|---|---|
| *A61C 7/14* | (2006.01) |
| *A61C 19/06* | (2006.01) |
| *A61C 7/00* | (2006.01) |
| *A61C 7/16* | (2006.01) |
| *A61C 7/08* | (2006.01) |
| *A61C 13/15* | (2006.01) |

(52) U.S. Cl.
CPC ............ *A61C 19/063* (2013.01); *A61C 7/002* (2013.01); *A61C 7/146* (2013.01); *A61C 7/08* (2013.01); *A61C 7/16* (2013.01); *A61C 19/003* (2013.01)

(58) Field of Classification Search
CPC ......... A61C 7/02; A61C 19/063; A61C 7/146; A61C 7/002; A61C 7/16; A61C 7/08; A61C 19/003
See application file for complete search history.

(56) References Cited

U.S. PATENT DOCUMENTS

| | | | |
|---|---|---|---|
| 5,575,655 A | 11/1996 | Darnell | |
| 6,288,138 B1 | 9/2001 | Yamamoto | |
| 6,607,382 B1 | 8/2003 | Kuo et al. | |
| 7,347,688 B2 * | 3/2008 | Kopelman | A61C 7/08 433/24 |
| 10,548,700 B2 * | 2/2020 | Fernie | A61C 7/146 |
| 2005/0042569 A1 | 2/2005 | Plan et al. | |
| 2005/0233276 A1 | 10/2005 | Kopeiman et al. | |
| 2010/0279243 A1 | 11/2010 | Cinader et al. | |

* cited by examiner

*Primary Examiner* — Ralph A Lewis
(74) *Attorney, Agent, or Firm* — Shay Glenn LLP

(57) ABSTRACT

The present disclosure provides methods, devices, and systems that utilize dental appliance etch templates prior to or during dental treatment. One dental appliance etch template includes a removable shell having one or more cavities formed therein, where the one or more cavities are shaped to receive teeth of a patient, and the shell includes a well, the well including a wafer, where the wafer includes etch material to etch a tooth of the patient.

20 Claims, 10 Drawing Sheets

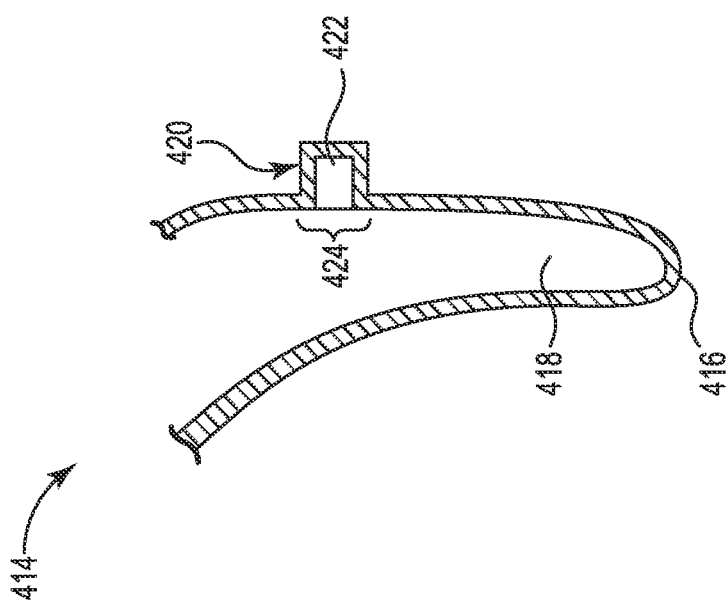

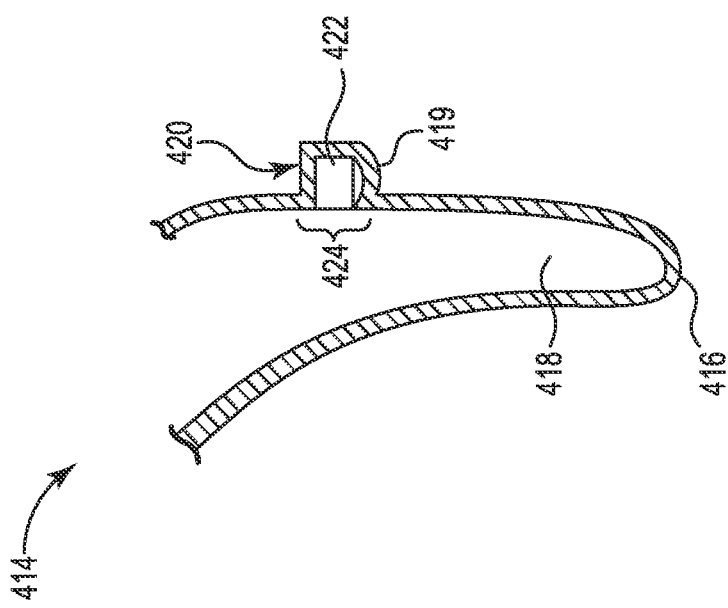

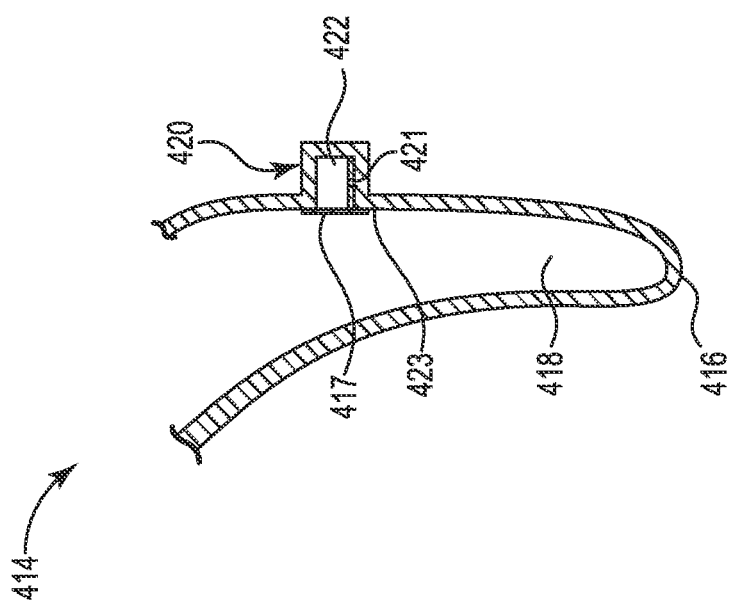

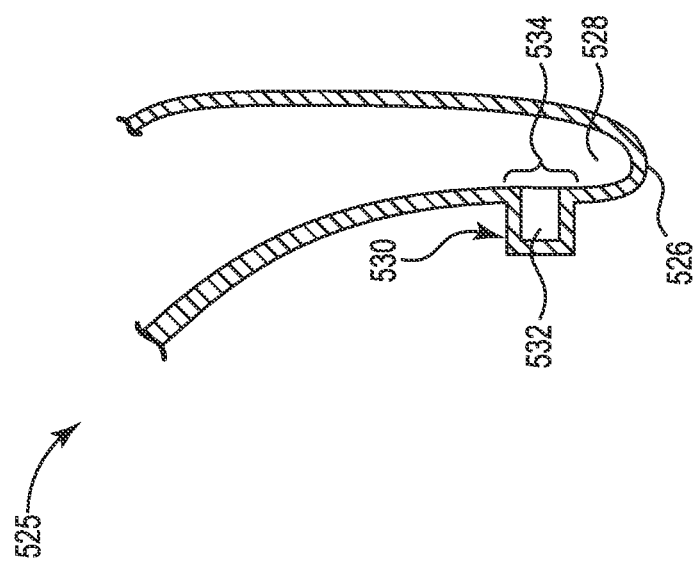

DENTAL APPLIANCE ETCH TEMPLATE

CROSS REFERENCE TO RELATED APPLICATIONS

This application is a continuation of U.S. patent application Ser. No. 15/382,235, filed on Dec. 16, 2016, titled "DENTAL APPLIANCE ETCH TEMPLATE," now U.S. Pat. No. 10,548,700, which is herein incorporated by reference in its entirety.

INCORPORATION BY REFERENCE

All publications and patent applications mentioned in this specification are incorporated herein by reference in their entirety to the same extent as if each individual publication or patent application was specifically and individually indicated to be incorporated by reference.

BACKGROUND

Dental treatments involve restorative and/or orthodontic procedures to improve the quality of life of a patient. For example, restorative procedures may be designed to implant a dental prosthesis (e.g., a crown, bridge, inlay, onlay, veneer, etc.) intraorally in a patient. Orthodontic procedures may include repositioning misaligned teeth and/or changing bite configurations for improved cosmetic appearance and/or dental function. Orthodontic repositioning can be accomplished, for example, by applying controlled forces to one or more teeth of a jaw of a patient over a period of time.

As an example, orthodontic repositioning may be provided through a dental process that uses positioning appliances for realigning teeth. Such appliances may utilize a shell of material having resilient properties, referred to as an "aligner," that generally conforms to a patient's teeth but is slightly out of alignment with a current tooth configuration.

Placement of such an appliance over the teeth may provide controlled forces in specific locations to gradually move the teeth into a new configuration. Repetition of this process with successive appliances in progressive configurations can move the teeth through a series of intermediate arrangements to a final desired arrangement. Appliances can also be used for other dental conditions, such as application of medications, appliances to help with sleep apnea, and other issues.

Attachments may be affixed to the one or more teeth of the patient (typically with an adhesive material, such as an attachment composite material) or directly cured to the tooth. These attachments interact with surfaces on the appliance to impart forces on one or more teeth.

Such systems typically utilize a set of appliances that can be used serially such that, as the teeth move, a new appliance from the set can be implemented to further move the teeth without having to take a new impression of the patient's teeth at every increment of tooth movement in order to make each successive appliance. The same attachments may be utilized with successive appliances or attachments may be added, removed, or replaced with other attachment shapes that may impart different force characteristics than a previous appliance and attachment combination (i.e., appliance and one or more attachments).

Currently, a treatment professional (e.g., a doctor or assistant) applies etch material to a location on a tooth at which a dental attachment is to be place on a tooth to prepare the location for the securing of the attachment thereon. Once the location on the tooth is etched, the dental attachment can be placed at the location of the etch on the tooth and attached, for example, via a bonding agent (e.g., an attachment composite).

The application of etch material to the location on the tooth is done by hand by the treatment professional and, therefore, is subject to user error. For instance, too much etch material may be applied to the tooth surface, resulting in more area on the tooth being etched than is necessary to attach the dental attachment. As a result, the bonding agent used to attach the dental attachment can adhere to more surface area on the tooth than is necessary for attaching the dental attachment. Therefore, a treatment professional may need to remove the excess bonding agent from the tooth surface, resulting in longer treatment times for the patient and excess work for the treatment professional. This can lead to a longer office visit for the patient, which can be more costly and more inconvenient to the patient.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 4A illustrates a side cutaway view of a dental appliance etch template including a well with a wafer placed at a particular position on a facial surface of a tooth according to a number of embodiments of the present disclosure.

FIG. 4B illustrates a side cutaway view of a dental appliance etch template including a well having a catch area and with a wafer placed at a particular position on a facial surface of a tooth according to a number of embodiments of the present disclosure.

FIG. 4C illustrates a side cutaway view of a dental appliance etch template including a well having an absorbent pad and with a wafer placed at a particular position on a facial surface of a tooth according to a number of embodiments of the present disclosure.

FIG. 5 illustrates a side view of a dental appliance etch template including a well with a wafer placed at a particular position on a lingual surface of a tooth according to a number of embodiments of the present disclosure.

DETAILED DESCRIPTION

Figure 1:
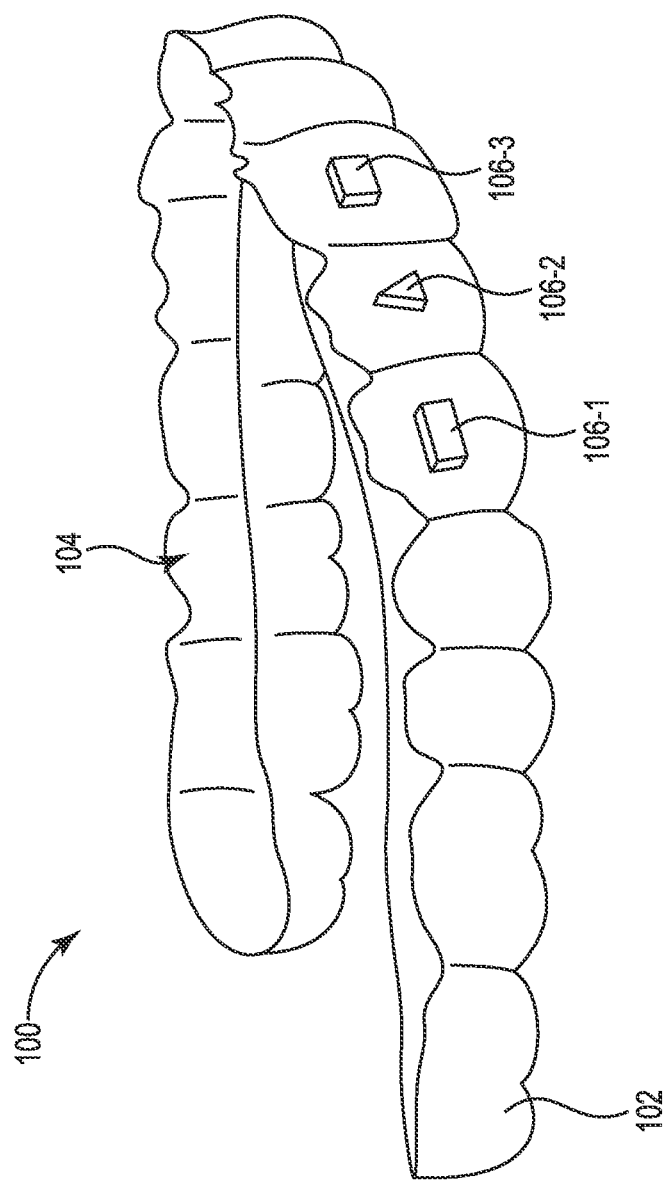
FIG. 1 illustrates a perspective view of a dental appliance etch template according to a number of embodiments of the present disclosure.

The present disclosure provides methods, devices, and systems that utilize dental appliance etch templates prior to or during dental treatment. Such solutions can allow for precise application of etch material at the location where the dental attachment is to be attached. Such a precise application of etch material can allow for faster application and cleanup of dental appliances than past procedures, reducing patient treatment time and cleanup work on the tooth surface for the treatment professional.

One appliance includes a removable shell having one or more cavities formed therein, wherein the one or more cavities are shaped to receive teeth of a patient, and wherein the shell includes a well, the well including a wafer, wherein the wafer includes etch material configured to etch a tooth of the patient. This and other embodiments will be discussed in more detail below.

In the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, "at least one of" a particular thing can refer to one or more of such things (e.g., at least one tooth can refer to one or more teeth).

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present disclosure, and should not be taken in a limiting sense.

FIG. 1 illustrates a perspective view of a dental appliance etch template 100 according to a number of embodiments of the present disclosure. In the embodiment of FIG. 1, the appliance 100 includes a removable shell 102 having one or more cavities 104 formed therein.

The appliance 100 can include the removable shell 102, where the one or more cavities 104 can be shaped to receive teeth of a patient. The removable shell 102 can include one or more wells 106-1, 106-2, 106-3 (referred to collectively as one or more wells 106). Each well of the one or more wells 106 can include a corresponding wafer. For example, well 106-1 can include a wafer, well 106-2 can include a wafer, and well 106-3 can include a wafer. As used herein, a wafer refers to a porous material capable of absorbing liquid. For example, a wafer can absorb etch material (e.g., an acidic material, such as phosphoric acid) that can etch a tooth of a patient. As used herein, etching refers to a process of chemically removing material from a surface of a tooth. Each wafer can include etch material configured to etch teeth of the patient at particular positions on the surfaces of the teeth, as will be further described herein.

The one or more wells 106 can be located in adjacent cavities of the one or more cavities 104. For example, the removable shell 102 can be designed to be placed over teeth of a patient's upper jaw, where the one or more wells 106 can be located in cavities shaped to receive a patient's first bicuspid (e.g., well 106-1), a patient's cuspid (e.g., well 106-2), and the patient's lateral incisor (e.g., well 106-3), although embodiments of the present disclosure are not limited to wells located in cavities corresponding to the patient's first bicuspid, cuspid, and/or lateral incisor of an upper jaw of the patient. For example, the one or more wells 106 can be located in cavities that can receive one or more other teeth of the upper jaw of the patient. Additionally, the removable shell 102 can be designed to be placed over teeth of a patient's lower jaw, where the one or more wells can be located in cavities that can receive any other teeth of the lower jaw of the patient.

The one or more wells can be located in non-adjacent cavities of the one or more cavities. Although not shown in FIG. 1, for clarity and so as not to obscure embodiments of the present disclosure, the removable shell can be designed to be placed over teeth of a patient's upper jaw, where the one or more wells can be located in cavities shaped to receive, for example, a patient's first molar, first bicuspid, and/or central incisor. In some embodiments, the removable shell can be for a patient's lower jaw, where the one or more wells can be located in cavities shaped to receive, for example, the patient's third molar, first molar, and/or central incisor.

Although each cavity of the removable shell 102 is described above as including only one well, embodiments of the present disclosure are not so limited. For example, a cavity of the removable shell 102 can include more than one well (e.g., two wells), where the wells include a wafer such that two different locations on a patient's tooth may be etched. In this example, two different dental attachments may then be attached to the same tooth of the patient.

Although the one or more wells 106 are shown in FIG. 1 as being located on a facial surface of removable shell 102, embodiments of the present disclosure are not so limited. For example, the one or more wells 106 may be located on a lingual surface of removable shell 102, or may be located on a combination of facial and/or lingual surfaces of removable shell 102, as will be further described herein with respect to FIGS. 4-7.

Further, in some embodiments, the shell may include a single cavity for the placement of a single tooth and that cavity may include one or more wells thereon.

In some embodiments, the appliance 100 can be fabricated through thermal-forming a sheet of plastic over a physical dental mold or through direct fabrication by a three dimensional printing apparatus. With respect to thermoforming, the physical dental mold, for instance, can represent an incremental position in a treatment plan to which a patient's teeth are to be moved and can include attachment shapes formed in the mold.

The physical dental mold can be manufactured, for example, by downloading a computer-aided design (CAD) virtual dental model to a rapid prototyping process, such as, for example, a computer-aided manufacturing (CAM) milling, stereolithography, and/or photolithography process.

The dental mold (e.g., set of molded teeth and/or jaw) can be created from a virtual model of one or more teeth and/or jaw of a patient. A virtual model, for example, can include an initial virtual dental model and/or intermediate virtual dental model (wherein the teeth of the patient have been moved with respect to their actual physical position). A dental mold can be formed in accordance with a unique treatment file that, for example, identifies a patient, a stage of a treatment plan, the virtual model of the number of teeth and/or jaw, and/or whether the dental mold is of the upper and/or lower dental arch.

In some computing device system processes, a treatment file can be accessed by a rapid prototyping apparatus machine or direct fabrication device, such as a stereolithography (SLA) or 3D printing machine, to form and/or create the dental mold. As discussed above, the result of the dental mold can include a set of molded teeth.

The set of molded teeth can include at least a replica of one or more teeth of the patient, but can also include other features such as gingival and jaw structures, among others. The dental mold can be used to make a dental appliance, for example, by creating a negative impression of the dental mold using polymeric sheets of material and vacuum forming the sheets over the dental mold, as discussed above.

For instance, a dental appliance etch template can be formed by layering a thermoformable sheet of material and/or multiple sheets of one or more materials over the dental mold. The materials can include a polymeric material, for instance.

Generally, the dental appliance etch template is produced and/or formed by heating the polymeric thermoformable sheet and vacuum or pressure forming the sheet over the dental mold (e.g., one or more molded teeth). A dental appliance etch template can, for example, include a negative impression of the dental mold. Such molding techniques can be used to create the dental appliance etch template.

As discussed above, in some embodiments, the appliance 100 can be fabricated through direct fabrication, such as via a three-dimensional (3D) printer. This can be beneficial, for example, as the treatment professional can print appliance 100 at their location rather than at a manufacturing facility, in some applications. Further, appliance 100 does not need to be formed around a mold of teeth when direct printed; this can save in manufacturing costs due to less time, materials, and employee time in creating such models and removing the components from the models.

Direct fabrication also allows for the design to be more easily and readily changed because the design can be altered via a computing device and direct printed from the modified design stored in memory on the computing device or a connected network or memory. Further, direct fabrication allows for creation of components of different material without substantial changes to equipment that may be used at a manufacturing facility, among other benefits.

For example, appliance 100 can be formed by printing using a three-dimensional printing apparatus. In some embodiments, the appliance 100 can be fabricated from the same material. Examples of material can include, but are not limited to: polymers such as, polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, or a combination of one or more such materials, which can be used to make dental appliances, such as aligners, or curable composite (e.g., a resin material) that can be used to attach orthodontic appliances to teeth or create orthodontic structures.

It may be beneficial to prepare the surface of the tooth for adhering of a dental attachment thereto. It is ideal if the preparation of the surface of the tooth takes place only at the area in which the attachment is to be attached. Such preparation can include etching of the surface of the tooth which improves the adhesion between the tooth surface and the attachment or adhesive material used to adhere the attachment to the tooth.

A wafer included in a well can include a surface that is to be placed against a surface of the tooth to be etched of the patient. For example, the wafers included in the one or more wells 106 can each include a surface that is to be placed against a surface of a patient's tooth that is to be etched. The wafer surface can be placed against a surface of the patient's tooth where etch material included in the wafer can be transferred to the surface of the patient's tooth that is to be etched, as will be further described herein.

As described above, a dental attachment can be placed at a particular position on a tooth. As used herein, a dental attachment refers to a structure placed on a surface of a tooth to aid in performing orthodontic procedures, including repositioning misaligned teeth and/or changing bite configurations for improved cosmetic appearance and/or dental function. A dental attachment is typically smaller than the surface area of a tooth onto which it is to be placed. The dental attachment may be designed to be located at a specific area of the tooth to impart the correct forces on the tooth or one or more other teeth via the shell to accomplish the desired orthodontic repositioning of the patient's teeth. The orthodontic repositioning of the tooth may be accomplished according to a treatment plan. The dental attachment can include a dental bracket.

A location of a well is based on a particular position on a surface of the tooth to be etched of the patient. That is, the location of each of the one or more wells 106 can be based on the particular position on the surface area of the patient's teeth that are to be etched. For example, well 106-1 may be located in a lower portion of a cavity of removable shell 102 such that an area on a lower portion of the patient's tooth is etched when contacted by etch material included in a wafer.

As another example, well 106-3 may be located in a higher portion of a cavity of removable shell 102 such that an area on a higher portion of the patient's tooth is etched when contacted by etch material included in a wafer. Such examples indicate that the location of the one or more wells 106 can correspond to locations on a patient's teeth that are to be etched.

The surface of the wafer can be placed at the particular position on the tooth surface via a well of the one or more wells 106 such that the etch material etches the tooth surface at the particular position on the tooth surface. For example, based on the location of well 106-1 being located in a lower portion of a cavity of removable shell 102, a surface of the wafer corresponding to well 106-1 can contact the tooth surface at a lower position on the tooth, resulting in the tooth surface being etched at the lower position on the tooth.

The shape of the well is based on a particular shape of an attachment to be placed on a tooth surface of the patient. The shape of the wafer is based on the shape of the well and the particular shape of the attachment to be placed on the tooth surface of the patient. That is, the shape of a well among the one or more wells 106 can correspond to the shape of the dental attachment, where the shape of the wafer can correspond to the shape of the well among the one or more wells 106.

A dental attachment can include a surface that is to be attached to a tooth of the patient. For instance, the surface of the dental attachment that is to be attached to the tooth of the patient can be a square shape, and the shape of well 106-3, and correspondingly the shape of the wafer included in well 106-3, can be a square shape. The surface of another dental attachment that is to be attached to a different tooth of the patient can be a triangular shape, and the shape of well 106-2, and correspondingly the shape of the wafer included in well 106-2, can be a triangular shape. The surface of another dental attachment that is to be attached to a different tooth of the patient can be a rectangular shape, and the shape of well 106-1, and correspondingly the shape of the wafer included in well 106-1, can be a rectangular shape.

A surface of a tooth of a patient can be etched via a wafer included in a well, among the one or more wells 102, at a particular location on the surface of the patient's tooth according to embodiments of the present disclosure. The removable shell 102 can include one or more cavities 104 that can include one or more wells 106, each including a wafer that can etch a tooth of the patient. Each of the one or more cavities 104 of the removable shell 102 can be shaped to receive teeth of the patient.

Each wafer included in the one or more wells 106 can include etch material. Each wafer is placed at a particular location on the tooth surface via a well such that etch material etches the tooth surface at the particular position on the tooth surface. That is, each wafer includes a surface that is to be placed against a surface of a tooth to be etched of the patient.

In some embodiments, the etch material included in each wafer can etch enamel of each tooth to be etched at the particular location on the surface of each tooth to be etched. As used herein, enamel refers to the normally visible part of a tooth that acts as a barrier to protect the tooth. For example, a wafer located in well 106-1 can etch the enamel of a tooth at a particular location (e.g., a lower portion) on the tooth that is to have a dental attachment attached at that location on the tooth.

In some embodiments, the etch material included in each wafer can etch dentin of each tooth to be etched at a particular location on the surface of each tooth to be etched. As used herein, dentin refers to calcified tissue covered by enamel and cementum of a tooth and surrounds the pulp of a tooth. For example, a wafer located in well 106-1 can etch the dentin of a tooth at a particular location (e.g., a lower portion) on the tooth that is to have a dental attachment attached at that location on the tooth.

A sealer can be applied to the surface of the tooth of the patient at the particular location on the surface of the tooth prior to attaching the dental attachment. That is, after a tooth is etched, a treatment professional can apply a sealer to the surface of the tooth of the patient at the location on the surface of the tooth that was etched via the wafer. The sealer can prevent saliva from the patient from contacting the etched surface of the tooth of the patient.

A treatment professional can attach a dental attachment to the tooth at the etched location of the tooth via a bonding agent. In some embodiments, the dental attachment can be included in a well of an attachment template and can be attached to the tooth at the particular location on the surface of the tooth that was etched.

An attachment template can include a different removable shell having one or more cavities formed therein, where the one or more cavities are shaped to receive the teeth of the patient. The well of the attachment template can be in the same location as the well in the attachment template such that the dental attachment is attached to the surface of the tooth via the bonding agent at the location on the surface of the tooth that was etched via the wafer.

Although the dental attachment is described as being attached by an attachment template, embodiments of the present disclosure are not so limited. For example, the treatment professional can attach the dental attachment via a bonding agent to the tooth by hand.

The bonding agent can be cured via an ultra-violet (UV) light source. That is, once the dental attachment is placed on the location of the surface of the tooth that was etched, a dental professional can cure the bonding agent such that the dental attachment is secured to the surface of the tooth. The dental professional can cure the bonding agent via a UV light source, although embodiments of the present disclosure are not limited to curing the bonding agent via a UV light source.

In some embodiments, a computing device (such as that described in relation to FIG. 8 below) can be used to create a treatment plan to move the teeth of a patient in an incremental manner to improve their position within the patient's mouth. Other dental appliances can be created to aid patients with sleep apnea or medication delivery, among other types of appliances.

A computing device can be used to create such devices or molds to fabricate such dental appliances and/or dental attachments. In some embodiments, a computing device can be used to virtually model such dental appliances and/or dental attachments.

A treatment professional may perform a method of attaching an attachment to a tooth. The method can include etching, via a wafer included in a well of an etching template, a surface of a tooth of a patient at a particular location on the surface of the tooth, where the etching template includes a removable shell having one or more cavities formed therein, where the one or more cavities are shaped to receive teeth of the patient. For example, a treatment professional can cause the removable shell, having the wafer with etch material included in the etch template, to be received by the teeth of the patient (e.g., the treatment professional can slide the etching template onto the patient's teeth). The wafer can then etch the surface of a patient's tooth.

The treatment professional can attach, via a bonding agent after the tooth or teeth of the patient have been etched, a dental attachment included in a well of an attachment template to the tooth of the patient at the particular location of the surface of the tooth, where the attachment template includes a removable shell having one or more cavities formed therein, where the one or more cavities are shaped to receive the teeth of the patient. For example, a treatment professional can cause the removable shell, having the dental attachment included in the attachment template, to be received by the teeth of the patient (e.g., the treatment professional can slide the attachment template onto the patient's teeth). The location of the well in the etching template can be in the same location as the well in the attachment template. The dental attachment can then attach to the surface of the patient's tooth or teeth at the location on the patient's tooth that was etched.

A dental appliance etch template, according to embodiments of the present disclosure, can allow for precise application of etch material to a location on a surface of a tooth at which a dental attachment is to be placed. Precise application of etch material can allow for etching of the tooth surface only at the location where the dental attachment is to be placed, reducing the likelihood that more tooth surface area is etched than is necessary. By decreasing the area where etching of a tooth occurs, the likelihood of bonding agent attaching to areas of a tooth where a dental attachment is not placed can be reduced. As a result, a dental professional may spend less time cleaning excess bonding agent from areas of the tooth where a dental attachment is not located, reducing treatment times for the patient and work load for the dental professional.

Figure 2:
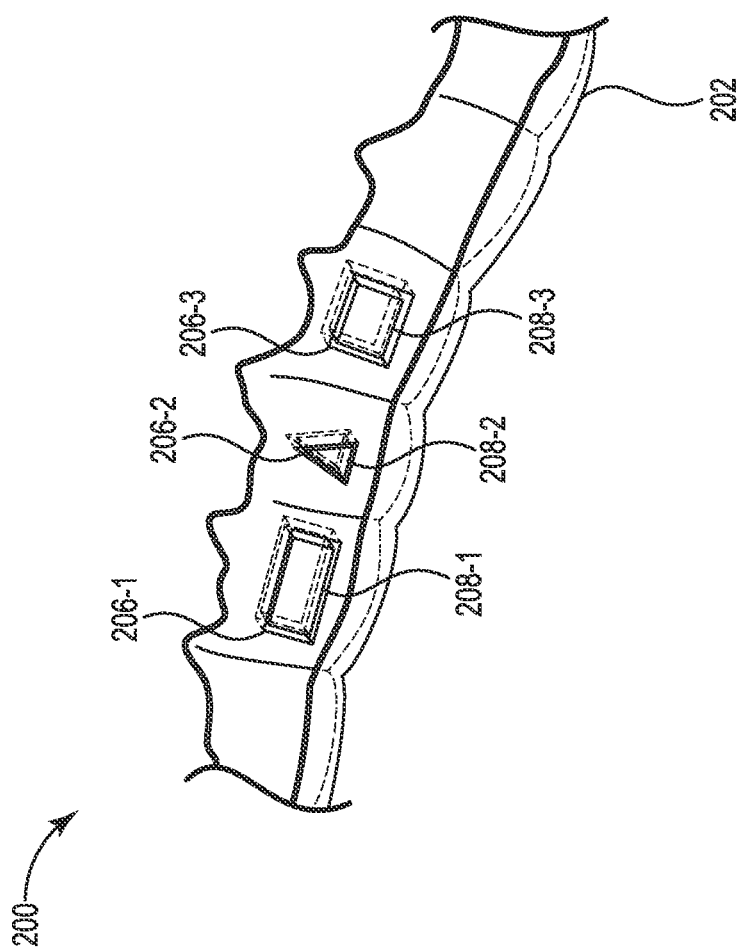
FIG. 2 illustrates a back view of a portion of the dental appliance etch template of FIG. 1.

FIG. 2 illustrates a back view of a portion of the dental appliance etch template 200 of FIG. 1. In the embodiment of FIG. 2, the dental appliance etch template can include a removable shell 202 (e.g., removable shell 102, previously described in connection with FIG. 1), one or more wells 206 (e.g., one or more wells 106, previously described in connection with FIG. 1), and one or more wafers 208-1, 208-2, 208-3 (referred to collectively as one or more wafers 208).

As shown in FIG. 2, the one or more wafers 208-1, 208-2, 208-3 are located in one or more cavities 206-1, 206-2, 206-3, respectively. In some embodiments, the one or more wafers 208 can include etch material and can be located in one or more cavities 206 prior to the treatment professional receiving the appliance 200. For example, the appliance 200 can be packaged such that in order to etch teeth of a patient, the treatment professional merely has to remove the packing material from appliance 200, and fit the appliance 200 over the teeth of the patient.

For example, in some embodiments, a release liner can be positioned across the opening of the well where the etch material will contact the tooth. A release liner can be a thin film of material (e.g., a flexible sheet of plastic material) that is secured around at least a portion of the open of the well (e.g., via a releasable adhesive that holds the sheet of material against the portion of the shell forming the opening for the well, or alternatively or additionally to the etch material. In this manner, the covering and/or encapsulating of the etch material within the well (and the release liner or other suitable packing material) can reduce evaporation of the etch material, reduces the possibility of contamination from dirt, dust, or other elements during packaging or transit, and/or leakage of the etch material depending on the consistency and type of etch material used, among other benefits.

In some embodiments, the one or more wafers 208 can be located separately from the one or more cavities 206. For example, the appliance 200 and the one or more wafers 208 can be packaged separately such that in order to etch teeth of a patient, the treatment professional has to place the one or more wafers 208 in the one or more cavities 206, and fit the appliance 200 over the teeth of the patient.

In various embodiments, the treatment professional may need to load etch material into the one or more wafers 208, as they may not include etch material when packaged. In some embodiments, the treatment professional may not need to load etch material into the one or more wafers 208, as they may already include etch material when packaged.

As shown in FIG. 2, the one or more wells 206 can be any suitable shape, such as a rectangular shape, a square shape, and/or a non-rectangular shape. That is, the well is at least one of a rectangular shape and a non-rectangular shape. For example, a dental attachment may be differently shaped according to its function and/or force to be imparted on the tooth. The one or more wells 206 can be shaped to correspond to the shape of the dental attachment.

Although embodiments of the present disclosure can be used with standardized dental attachments, since the apparatus can be fabricated to be used with a specific patient's teeth positioning, specialized attachments can also be designed and can be made available to a treatment professional.

Such specialization can also, for example, include the size of the dental attachment, shape of the dental attachment, and other suitable specialized characteristics. Accordingly, the patient will be able to get a more customized treatment based on use of such embodiments. This can allow the dental appliance etch template to be specialized to the patient, but not be onerous on the treatment professional who, for example, may not have attachment design skills or capabilities.

Figure 3:
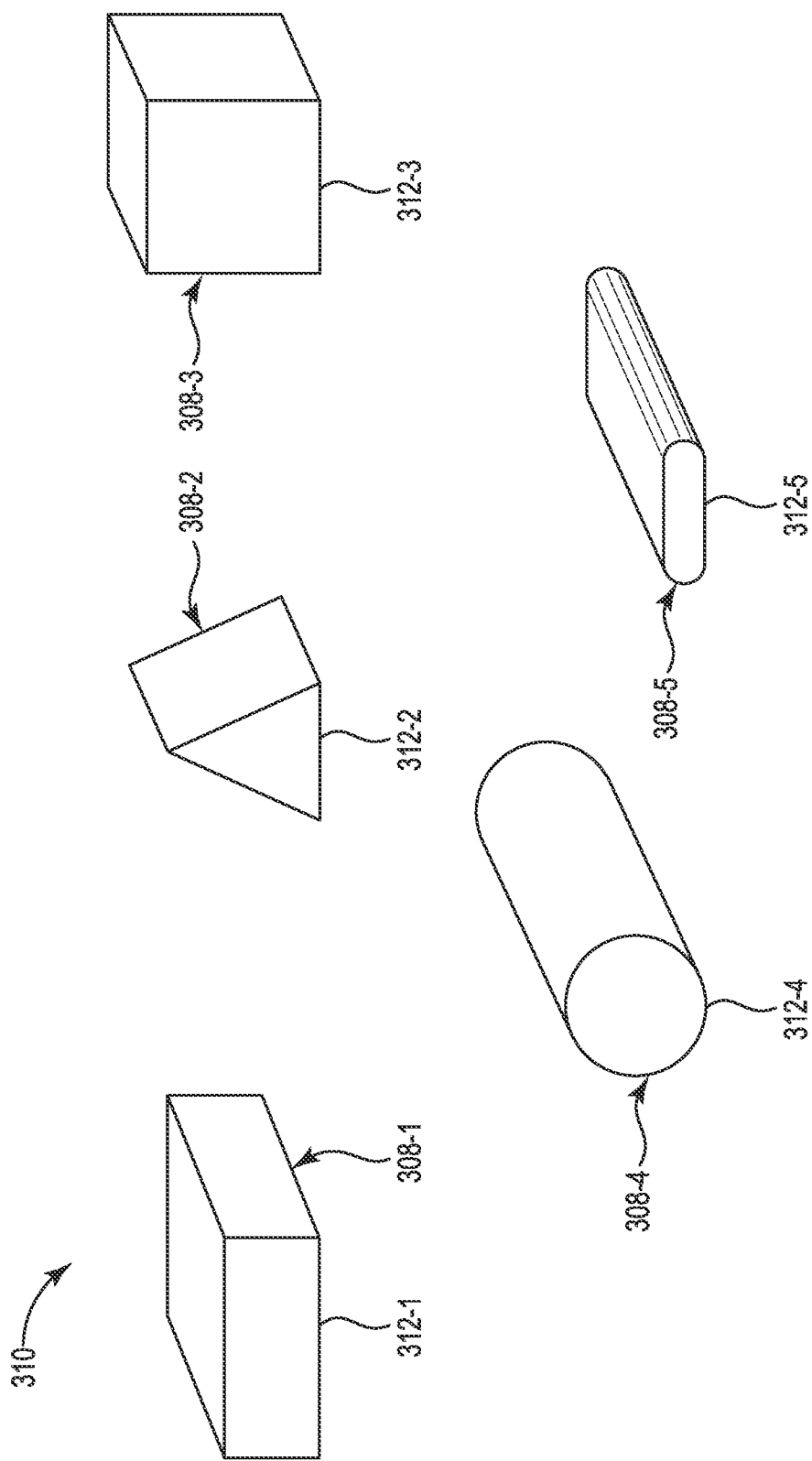
FIG. 3 illustrates perspective views of various differently shaped wafers according to a number of embodiments of the present disclosure.

FIG. 3 illustrates perspective views 310 of various differently shaped wafers according to a number of embodiments of the present disclosure. As shown in FIG. 3, the one or more wafers 308-1, 308-2, 308-3, 308-4, 308-5 (referred to collectively as one or more wafers 308) can be of various shapes.

As shown in FIG. 3, the one or more wafers 308 can be any suitable shape. That is, a wafer can is least one of a rectangular shape and a non-rectangular shape. As previously described in FIG. 2, the shapes of the one or more wafers 308 can correspond to the shape of the well the wafer is located in, and/or can be shaped according to a shape of a dental attachment to be attached to a tooth.

For instance, wafer 308-1 is shaped as a rectangular prism. As used herein, a prism refers to a three-dimensional geometric shape having bases with the same shape. For example, wafer 308-1 can be a prism with rectangular bases and six surfaces. Wafer 308-1 can include surface 312-1 which contacts the surface of the tooth to be etched such that etch material included in wafer 308-1 is transferred from wafer 308-1 onto a location on the surface of the tooth to be etched.

Wafer 308-2 is shaped as a triangular prism having triangular bases and five surfaces. Wafer 308-2 can include surface 312-2. Surface 312-2 can be the surface of wafer 308-2 which contacts the surface of the tooth to be etched such that etch material included in wafer 308-2 is transferred from wafer 308-2 onto a location on the surface of the tooth to be etched.

Wafer 308-3 is shaped as a cube. As used herein, a cube refers to a prism with six congruent faces. For example, wafer 308-3 can be a prism with square bases and six surfaces. Wafer 308-3 can include surface 312-3. Surface 312-3 can be the surface of wafer 308-3 which contacts the surface of the tooth to be etched such that etch material included in wafer 308-3 is transferred from wafer 308-3 onto a location on the surface of the tooth to be etched.

Wafer 308-4 is shaped as a cylinder. As used herein, a cylinder refers to a prism with two parallel circular faces and three surfaces. Wafer 308-4 can include surface 312-4 which contacts the surface of the tooth to be etched such that etch material included in wafer 308-4 is transferred from wafer 308-4 onto a location on the surface of the tooth to be etched.

Wafer 308-5 can be shaped as an elliptic cylinder. As used herein, an elliptic cylinder refers to a prism with two parallel elliptical faces and three surfaces. Wafer 308-5 can include surface 312-5 which contacts the surface of the tooth to be etched such that etch material included in wafer 308-5 is transferred from wafer 308-5 onto a location on the surface of the tooth to be etched.

Although the one or more wafers 308 are described as including a rectangular prism, a triangular prism, a cube, a cylinder, and/or an elliptical cylinder, embodiments of the present disclosure are not limited to such shapes. For example, the one or more wafers 308 can be any other shape, and can be shaped based on a shape of the dental attachment to be attached to a surface of the tooth such that the etched surface of the tooth matches the shape of the dental attachment to be attached thereto.

FIG. 4A illustrates a side view 414 of a dental appliance etch template 416 including a well 420 with a wafer 422 placed at a particular position 424 on a facial surface of a tooth 418 according to a number of embodiments of the present disclosure. As shown in FIG. 4A, the appliance 416 can be fitted over a tooth 418 of a patient. Tooth 418 of a patient can be etched using appliance 416 as previously described in connection with FIG. 1. As shown in FIG. 4A, the tooth 418 is illustrated as an incisor, although embodiments of the present disclosure are not limited to etching incisors using such appliances.

Appliance 416 can include well 420, for example, located on a facial surface of the removable shell of appliance 416. For instance, well 420 can be located on a facial surface of a cavity of appliance 416 that can receive one of one or more teeth of a patient. Well 420 can include wafer 422. Wafer 422 can be placed at a particular location 424 on a surface of tooth 418 to be etched, where wafer 422 includes a surface that is placed against (e.g., contacts) the particular location 424 of the surface of tooth 418 to be etched.

A wafer can be made from any suitable material that will hold the etch material during the etching process. For example, an absorbent material such as paper, cotton, sponge, an absorbent polymer, or other such suitable materials can be utilized.

The wafer can be held in place within the well in any suitable manner and can be permanently affixed to the well or can be removable. For example, an adhesive material can be applied between one or more surfaces of the well and one or more surfaces of the wafer.

In some embodiments, the wafer can be constructed of a resilient material (e.g., sponge), its size can be reduced and then once in place, it can expand and friction between the surfaces of the well and the wafer can frictionally hold it within the well. In such an embodiment, the wafer can be removed from the well, etch material can be applied, and then the wafer can be returned to the well.

In various embodiments, when the etch material is applied, the wafer will expand such that friction between the surfaces of the well and the wafer can frictionally hold it within the well. For example, the wafer without etch material can have a first diameter and the wafer with the etch material has a second diameter that is larger than the first diameter.

In some embodiments, the shape of the interior surfaces of the well can be shaped to hold the wafer in place. For example, a portion of the surface of the well can be constricted (e.g., sides of the well are closer together at some portion of the well) and a wafer constructed from a resilient material can be forced past the constriction and expanded past the constriction to hold the wafer in place.

The use of a resilient wafer material can also be beneficial in that if the cavity for receiving the tooth is not accurately sized. For example, the wafer can be sized such that the material's resilient nature allows it to contact the surface of the tooth even though the wall of the cavity may not be contacting the tooth.

Although not shown in FIG. 4A, it should be noted that, in some embodiments, one or more walls of the well can extend past the side wall of the tooth receiving cavity and into the tooth receiving cavity. For example, a bottom surface of the well (as it will be oriented when positioned in the patient's mouth) can extend into the tooth receiving cavity inward from the side wall of the cavity. Thus the extended bottom surface of the well can be used to catch any drip of liquid from the wafer, for example, resulting from the compression of the wafer. In this manner, the extended wall of the well can reduce the possibility of etching more tooth surface that intended.

FIG. 4B illustrates a side cutaway view of a dental appliance etch template including a well having a catch area and with a wafer placed at a particular position on a facial surface of a tooth according to a number of embodiments of the present disclosure. As can be seen in the embodiment of FIG. 4B, the well has a well bottom, an opening opposite the well bottom, and one or more side walls (one side wall, if the shape of the well is a cylinder).

However, when oriented with respect to the tooth as shown in FIG. 4B, one or more of the side walls of the well, become the top and bottom surfaces of the well with the well bottom generally vertical. In such an embodiment, the bottom surface of the well can be designed to bow outward (away from the center of the well). In this manner, the bowed out portion can be used to catch any excess etch material. This can be beneficial, for example, to limit potential dripping or oozing of etch material down the inside of the cavity of the appliance 414 or down the surface of the tooth, thereby reducing the potential of etching unintended portions of tooth 418.

In the embodiment of FIG. 4B, the well 420 includes a bowed side wall (the bottom wall when positioned in the patient's mouth). This bowed side wall creates a reservoir that allows for any excess liquid that may be in the wafer to drop into the reservoir area and not onto a patient's tooth. Such a feature can reduce or eliminate the over etching of the tooth due to providing extra etch material to the tooth. As the reader will understand, a reservoir can be any suitable shape as long as it provides an area into which the excess etch material can drop.

FIG. 4C illustrates a side cutaway view of a dental appliance etch template including a well having an absorbent pad and with a wafer placed at a particular position on a facial surface of a tooth according to a number of embodiments of the present disclosure. The embodiment of FIG. 4C provides another mechanism that can be used to catch excess etch material. In this embodiment, an absorbent material 421 is positioned in the well 420, such that when oriented as the appliance 414 will be in the patient's mouth, excess etch material will be absorbed by the absorbent material 421 and not on the patient's tooth.

Such embodiments can be particularly beneficial in embodiments where the wafer is compressible and where the end of the wafer extends beyond the portion of the appliance 423 that forms the opening of the well 420. Such embodiments can be beneficial because when compressed, they may better conform to the shape of the surface of the tooth and may provide better contact force against the tooth surface which may result in a better etch of the tooth surface, among other benefits.

In such embodiments, when the wafer is compressed as it comes in contact with the surface of the tooth to be etched, the compression may cause etch material to be forced out of the wafer. The absorbent material 421 can absorb the etch material expelled from the wafer.

FIG. 4C also illustrates a release liner 417 (as discussed previously in the discussion of FIG. 2) that can be used to keep the wafer 422 and/or etch material in the well 420. In practice, this release liner 417 will be removed before the etch material can etch the surface of tooth 418, but for purposes of fitting the appliance to the patient, it may be positioned as shown and then subsequently removed before the etching process takes place.

FIG. 5 illustrates a side view 525 of a dental appliance etch template 526 including a well 530 with a wafer 532 placed at a particular position 534 on a lingual surface of a tooth 528 according to a number of embodiments of the present disclosure. As shown in FIG. 5, the appliance 526 can be fitted over a tooth 528 of a patient. Tooth 528 of a patient can be etched using appliance 526 as previously described in connection with FIG. 1. FIG. 5 also illustrates that the tooth 528 can be an incisor, although embodiments of the present disclosure are not limited to etching incisors using such appliances.

Appliance 526 can include well 530 which, for example, can be located on a lingual surface of the removable shell of appliance 526. For instance, well 530 can be located on a lingual surface of a cavity of appliance 526 that can receive one of one or more teeth of a patient. Well 530 can include wafer 532. Wafer 532 can be placed at a particular location 534 on a surface of tooth 528 to be etched, where wafer 532 includes a surface that is placed against (e.g., contacts) the particular location 534 of the surface of tooth 528 to be etched.

Figure 6:
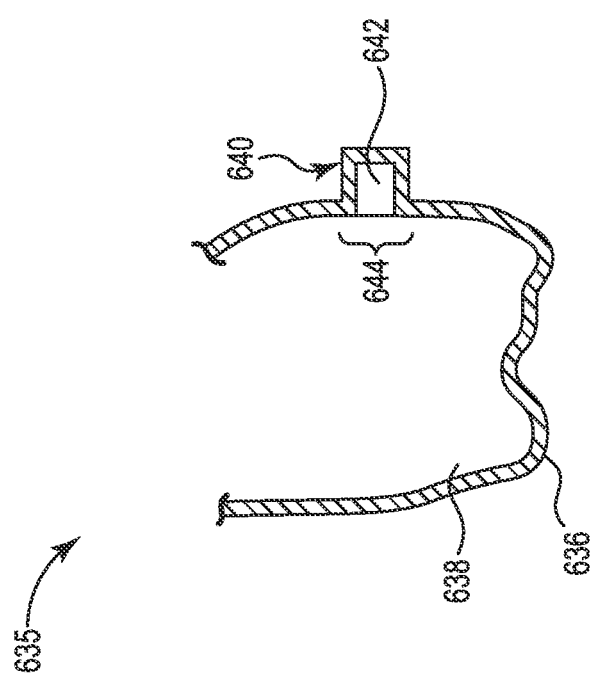
FIG. 6 illustrates a side view of a dental appliance etch template including a well with a wafer placed at a particular position on a facial surface of a tooth according to a number of embodiments of the present disclosure.

FIG. 6 illustrates a side view 635 of a dental appliance etch template 636 including a well 640 with a wafer 642 placed at a particular position 644 on a facial surface of a tooth according to a number of embodiments of the present disclosure.

As shown in FIG. 6, the appliance 636 can be fitted over a tooth 638 of a patient. Tooth 638 of a patient can be etched using appliance 636 as previously described in connection with FIG. 1. As shown in FIG. 6, the tooth 638 can be a bicuspid, although embodiments of the present disclosure are not limited to etching bicuspids using appliance 636.

Appliance 636 can include well 640. Well 640 can be located on a facial surface of the removable shell of appliance 636. For example, well 640 can be located on a facial surface of a cavity of appliance 636 that can receive one of one or more teeth of a patient. Well 640 can include wafer 642. Wafer 642 can be placed at a particular location 644 on a surface of tooth 638 to be etched, where wafer 642 includes a surface that is placed against (e.g., contacts) the particular location 644 of the surface of tooth 638 to be etched.

Figure 7:
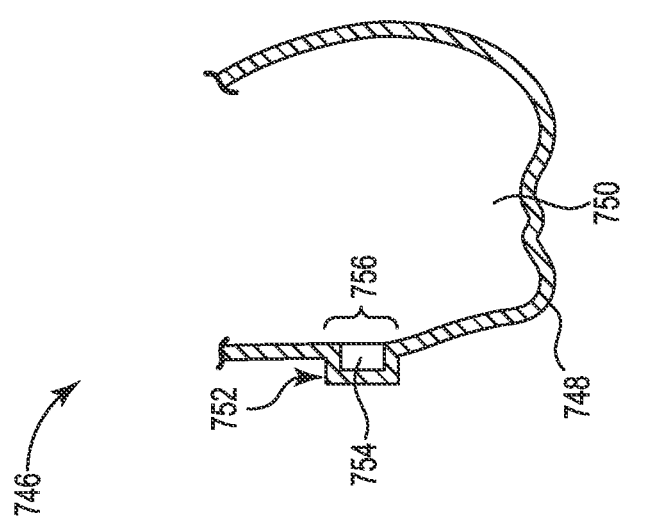
FIG. 7 illustrates a side view of a dental appliance etch template including a well with a wafer placed at a particular position on a lingual surface of a tooth according to a number of embodiments of the present disclosure.

FIG. 7 illustrates a side view 746 of a dental appliance etch template 748 including a well 752 with a wafer 754 placed at a particular position 756 on a lingual surface of a tooth according to a number of embodiments of the present disclosure.

As shown in FIG. 7, the appliance 748 can be fitted over a tooth 750 of a patient. Tooth 750 of a patient can be etched using appliance 748 as previously described in connection with FIG. 1. As shown in FIG. 7, the tooth 750 can be a bicuspid, although embodiments of the present disclosure are not limited to etching bicuspids using appliance 748.

Appliance 748 can include well 752. Well 752 can be located on a lingual surface of the removable shell of appliance 748. For example, well 752 can be located on a lingual surface of a cavity of appliance 748 that can receive one of one or more teeth of a patient. Well 752 can include wafer 754. Wafer 754 can be placed at a particular location 756 on a surface of tooth 750 to be etched, where wafer 754 includes a surface that is placed against (e.g., contacts) the particular location 756 of the surface of tooth 750 to be etched.

Figure 8:
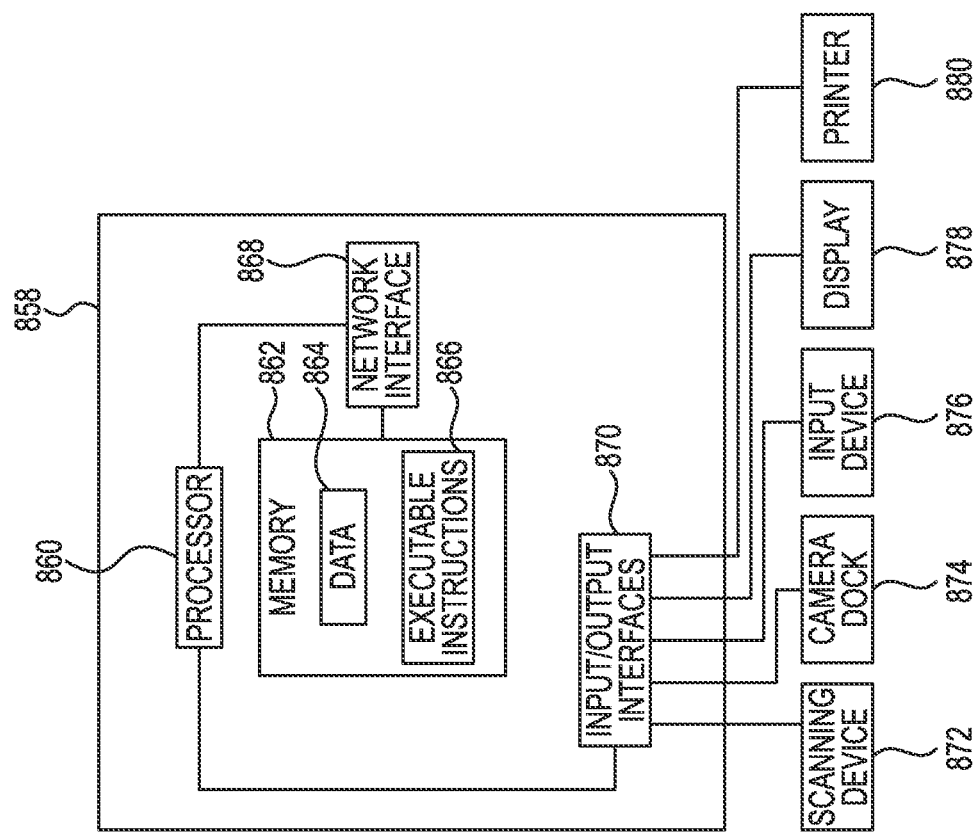
FIG. 8 illustrates a computing device that can be utilized according to one or more embodiments of the present disclosure.

FIG. 8 illustrates a computing device 858 that can be utilized according to one or more embodiments of the present disclosure. For instance, a computing device 858 can have a number of components coupled thereto.

The computing device 858 can include a processor 860 and a memory 862. The memory 862 can have various types of information including data 864 and executable instructions 866, as discussed herein.

The processor 860 can execute instructions 866 that are stored on an internal or external non-transitory computer device readable medium (CRM). A non-transitory CRM, as used herein, can include volatile and/or non-volatile memory.

Volatile memory can include memory that depends upon power to store information, such as various types of dynamic random access memory (DRAM), among others. Non-volatile memory can include memory that does not depend upon power to store information.

Memory 862 and/or the processor 860 may be located on the computing device 858 or off of the computing device 858, in some embodiments. As such, as illustrated in the embodiment of FIG. 8, the computing device 858 can include a network interface 868. Such an interface 868 can allow for processing on another networked computing device, can be used to obtain information about the patient, and/or can be used to obtain data and/or executable instructions for use with various embodiments provided herein.

As illustrated in the embodiment of FIG. 8, the computing device 858 can include one or more input and/or output interfaces 870. Such interfaces 870 can be used to connect the computing device 858 with one or more input and/or output devices 872, 874, 876, 878, 880.

For example, in the embodiment illustrated in FIG. 8, the input and/or output devices can include a scanning device 872, a camera dock 874, an input device 876 (e.g., a mouse, a keyboard, etc.), a display device 878 (e.g., a monitor), a printer 880, and/or one or more other input/output devices. The input/output interfaces 854 can, for example, receive executable instructions and/or data, storable in the data storage device (e.g., memory), representing a virtual dental model of a patient's dentition an/d or a virtual model of the appliance to be created.

In some embodiments, the scanning device 872 can be configured to scan one or more physical dental molds of a patient's dentition. In one or more embodiments, the scanning device 872 can be configured to scan the patient's dentition, a dental appliance, and/or attachment placement structure directly. The scanning device 872 can be configured to input data into the computing device 858.

In some embodiments, the camera dock 874 can receive an input from an imaging device (e.g., a 2D or 3D imaging device) such as a digital camera, a printed photograph scanner, and/or other suitable imaging device. The input from the imaging device can, for example, be stored in memory 862.

The processor 860 can execute instructions to provide a visual indication of a treatment plan, a dental appliance, and/or a one or more dental attachments on the display 878. The computing device 858 can be configured to allow a treatment professional or other user to input treatment goals. Input received can be sent to the processor 860 as data 864 and/or can be stored in memory 862.

Such connectivity can allow for the input and/or output of data and/or instructions among other types of information. Some embodiments may be distributed among various computing devices within one or more networks, and such systems as illustrated in FIG. 8 can be beneficial in allowing for the capture, calculation, and/or analysis of information discussed herein.

The processor 860 coupled to the memory 862 can, for example, include instructions to cause the computing device 858 to perform a method including, for example, creating a treatment plan based on a virtual model of a jaw of a patient, wherein the treatment plan includes use of a dental attachment.

In some embodiments, the processor 860 coupled to the memory 862 can cause the computing device 858 to perform the method comprising modeling a virtual dental attachment based on the treatment plan, wherein the virtual dental attachment is constructed to provide one or more forces desired by the treatment plan.

Such analysis can be accomplished one or more times for a treatment plan. For example, if a treatment plan has 30 stages, it would be possible to have different dental attachments for each stage or possibly more, if desired. However, in many instances the attachment type, position, and/or orientation may be changed a few times during the treatment plan. Further, an etch template can be designed for use before a treatment plan commences, as a first step in a treatment plan, or as part of a first step in a treatment plan.

Once a location and orientation of an attachment and its force characteristics are determined during the creation of the treatment plan, in some embodiments, the location, orientation, and/or forces characteristics can be used to create the etch template and the location and orientation of the one or more wells located thereon. In such embodiments, the location on the tooth is where the attachment will be placed on the surface of the tooth and the orientation is how the attachment is positioned at that location.

Through use of virtual modeling, dental attachments can be virtually tested and the best attachment type, shape, position, and/or orientation can be selected without inconveniencing the patient with trial and error of attachments during treatment. Additionally, use of virtual modeling can also allow for custom design of attachment shapes that will be suitable for a specific patient's needs and/or a specific function within an area of a patient's mouth. From such analysis, different physical dental attachment placement apparatuses can be created from the virtual dental attachment placement apparatus data that would be utilized to create the attachments needed for the different stages.

Further, the specialized nature of the design of such dental attachments can also allow the attachments to be made from different materials. In this manner, dental attachments during a treatment plan or even during one stage can be of a different material that may provide more specialized force distribution than was possible with standard attachments.

In some embodiments, the printer 880 can be a three dimensional or direct fabrication device that can create a dental appliance directly from instructions from the computing device 858. Embodiments of the present disclosure utilizing such technology can be particularly beneficial for a variety of reasons. For example, such direct manufacture allows for less waste of materials due to less processing steps and increased specialization of the attachment placement structure, attachment materials, and/or other components of the appliances described herein.

One example embodiment that can be accomplished with such a computing system is a method of forming an etching template that includes defining a virtual three dimensional etching template body formed by a virtual shell having one or more cavities formed therein that are shaped to each receive one or more teeth of a patient. The shape of the shell can be based on the actual position of the teeth of the patient or can be based on a stage of the treatment plan that will be used to adjust the position of the teeth of the patient, for example.

This example method also includes identifying a virtual position on the template body at which an etching material well is to be placed on the virtual template body based on an area that is to be etched on a particular one of the patient's teeth. In this manner, the position of the well can be virtually identified and positioned without having to place a physical etch template on the patient's teeth.

The example method also includes forming a physical etching template based on the virtual three dimensional template body having the etching material well formed thereon based on the identified virtual position.

As discussed herein, such methods can also include creating a treatment plan based on a virtual model of at least one tooth of the patient, wherein the treatment plan includes use of an attachment placed at a particular position on a particular one of the patient's teeth. In such methods, the treatment plan may include one or more attachments being used in a particular stage or multiple attachments being used in one or more stages.

As discussed above, in some such method embodiments, creating a treatment plan based on a virtual model can include creating multiple stages for the treatment of the patient wherein one or more attachments are used in at least one stage of the treatment plan and each stage utilizes a dental appliance in conjunction with the one or more attachments. Such embodiments can allow for the creation, for example, of multiple stages for the treatment of the patient wherein each stage utilizes a different dental appliance and wherein at least one of the stages includes moving one or more teeth from a first position to a second position. This can further allow for etch templates to be created from each tooth, each attachment location, and/or each stage of treatment, which can be beneficial to the treatment professional as it can improve the accuracy of the process of etching each location.

Such method embodiments can be used for determining a position on a particular tooth for placement of each attachment. This information can then be used for defining an area to be etched on the tooth that includes the position at which the attachment is to be placed based on the treatment plan. In this manner, the template can be designed to precisely etch an area to be used for affixing the attachment.

In some embodiments, the method can include defining an etch area on the tooth that includes the particular position on the tooth at which the attachment is to be placed based on the treatment plan. The etch area can be the same size and in some cases the shape of the area can be the same as the surface of the attachment that is to be attached to the surface of the tooth. In some embodiments, the etch area may be slightly larger or smaller or shaped differently than the surface of the attachment that is to be attached to the surface of the tooth. The etch area can be determined by a treatment professional or in some cases can be defined by software, based on size, shape, position, and orientation information from the virtual model of one or more of the patient's teeth.

Methods can also include defining the shape and orientation of the well on the virtual three dimensional etch template body based on an area that is to be etched (etch area) on a particular one of the patient's teeth. From this information a physical etching template can be formed based on the virtual three dimensional template body having the etching material well formed thereon, which can, for example, be based on the identified virtual position and defined shape and orientation from the virtual model created of the etch template.

The embodiments of the present disclosure can provide a number of benefits. For example, the embodiments described herein can allow for precise application of etch material to a surface of a tooth at which a dental attachment is to be placed, allowing for less tooth surface being etched. As a result, a dental professional can spend less time removing excess bonding agent from areas of the tooth where a dental attachment is not located. This can save time for the dental professional as well as reduce treatment times for patients, among other benefits.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A dental appliance comprising:
   a removable shell including:
      one or more cavities configured to receive teeth of a patient's dentition and shaped to apply resilient repositioning forces to at least a portion of the teeth; and
      a well formed in at least one of the one or more cavities, the well including a compressible wafer with etch material absorbed therein, wherein the well is arranged to position the compressible wafer at an attachment location on a tooth of the patient's dentition to etch the attachment location for an orthodontic attachment, the well including an absorbent material positioned adjacent the compressible wafer to catch excess etch material from the compressible wafer.

2. The dental appliance of claim 1, wherein a shape of the well is based on a particular shape of the orthodontic attachment to be placed on the tooth.

3. The dental appliance of claim 2, wherein a shape of the compressible wafer is based on the shape of the well and the particular shape of the orthodontic attachment to be placed on the tooth.

4. The dental appliance of claim 1, wherein the well is at least one of a rectangular shape and a non-rectangular shape.

5. The dental appliance of claim 1, wherein the compressible wafer is at least one of a rectangular shape and a non-rectangular shape.

6. The dental appliance of claim 1, wherein the well is located on a facial surface of the shell.

7. The dental appliance of claim 1, wherein the well is located on a lingual surface of the shell.

8. The dental appliance of claim 1, wherein the absorbent material is positioned below the compressible wafer when the removable shell is placed on the patient's dentition.

9. An etching template comprising:
   a removable shell including:
      one or more cavities configured to receive teeth of a patient's dentition and configured to orient a well within one of the cavities with respect to an attachment location on a surface of a particular tooth of the patient's dentition;
      a compressible wafer within the well, the compressible wafer having an etch material absorbed therein for etching the attachment location on the surface of the particular tooth; and
      an absorbent material positioned adjacent the compressible wafer within the well to catch excess etch material expelled from the compressible wafer.

10. The etching template of claim 9, wherein the well has one or more walls shaped to contain the excess etch material.

11. The etching template of claim 9, wherein the one or more cavities includes a plurality of wells with corresponding compressible wafers therein.

12. The etching template of claim 9, wherein the well includes a liner across an opening of the well, the liner being removable to expose the compressible wafer.

13. The etching template of claim 9, wherein the well is located on a facial surface of the shell.

14. The etching template of claim 9, wherein the well is located on a lingual surface of the shell.

15. A method of attaching a dental attachment to a tooth, the method comprising:
   placing an etching template on a patient's dentition, the etching template including a removable shell having one or more cavities configured to receive teeth of the patient's dentition and shaped in accordance with at least a portion of the teeth, at least one of the cavities including a well having a compressible wafer with etch material absorbed therein, wherein placing the etching template on the patient's dentition positions the compressible wafer adjacent to an attachment location on a surface of one of the teeth, wherein the etch material etches the attachment location, the well including an absorbent material positioned adjacent the compressible wafer that catches excess etch material from the compressible wafer;
   removing the etching template from the patient's dentition; and
   attaching, using a bonding agent, the dental attachment to the attachment location.

16. The method of claim 15, further comprising applying a sealer to the attachment location prior to attaching the dental attachment.

17. The method of claim 15, further comprising curing the bonding agent via an ultra-violet (UV) light source.

18. The method of claim 15, wherein the dental attachment includes a dental bracket.

19. A method of forming an etching template, comprising:
   forming a virtual three dimensional (3D) etching template body having one or more cavities shaped to receive teeth of a patient's dentition;
   forming a virtual well in at least one of the one or more cavities of the virtual 3D etching template body, the virtual well configured to be positioned adjacent an attachment location of a tooth surface of the patient's dentition;

forming the etching template based on the virtual 3D etching template body, the etching template including a well corresponding to the virtual well;

positioning a compressible wafer within the well, the compressible wafer having an etch material absorbed therein for etching the attachment location on the tooth surface; and positioning an absorbent material adjacent the compressible wafer within the well to catch excess etch material expelled from the compressible wafer.

20. The method of claim 19, further including creating a treatment plan based on a virtual model of at least one tooth of the patient, wherein the treatment plan includes use of an attachment placed at the attachment location etched by the etching material.

* * * * *